Jan. 4, 1944.  G. V. PLAUT-CARCASSON  2,338,536
NAVIGATIONAL INSTRUMENT
Filed Dec. 22, 1941  2 Sheets—Sheet 1

INVENTOR
GEORGE VINCENT PLAUT CARCASSON
BY *Ernest J. Meehan* HIS ATTORNEY.

Jan. 4, 1944.  G. V. PLAUT-CARCASSON  2,338,536
NAVIGATIONAL INSTRUMENT
Filed Dec. 22, 1941   2 Sheets-Sheet 2
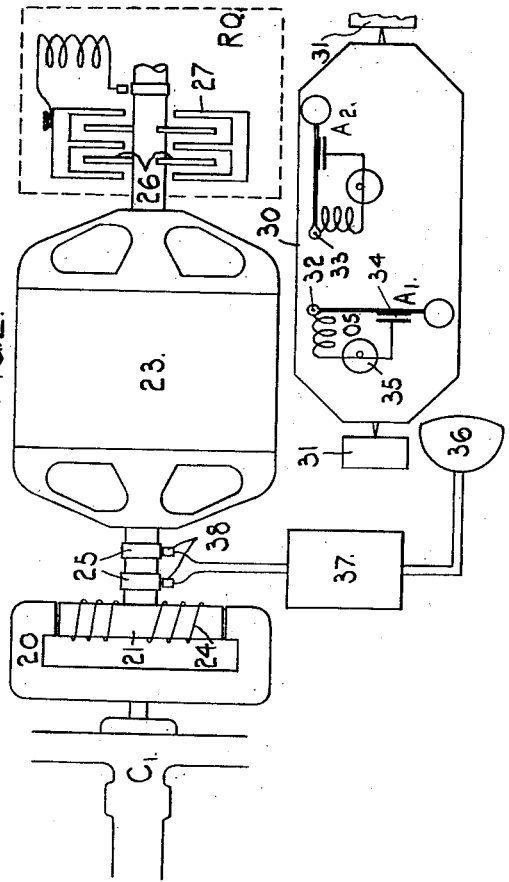
INVENTOR
GEORGE VINCENT PLAUT CARCASSON
BY Ernest F. Macklin HIS ATTORNEY.

Patented Jan. 4, 1944

2,338,536

UNITED STATES PATENT OFFICE

2,338,536

NAVIGATIONAL INSTRUMENT

George Vincent Plaut-Carcasson, Ham, England

Application December 22, 1941, Serial No. 424,069
In Great Britain September 3, 1940

5 Claims. (Cl. 73—152)

This invention relates to navigational instruments with more essential reference to instruments for use, e. g., in aircraft, under conditions of poor visibility or to provide a check on stellar bearings or dead-reckoning.

In aircraft particularly, under adverse weather conditions which may render it impossible to take a bearing, great difficulty is experienced in arriving—by dead reckoning—with any reasonable degree of accuracy at the position of the craft in flight owing to the impossibility of assembling drift and the resultant effect of such repeated changes in direction as may be forced upon the pilot of the craft.

As will be appreciated, by arranging two inertia members or spring weights at right angles to each other, a direct indication may be obtained of any acceleration taking place in any direction in the plane containing the members and further, it will be appreciated that by integrating and correlating such accelerations, a measure can be had of the speed and direction of the vehicle, from which further integration its position can be plotted and if need be indicated mechanically, by cathode ray tube or otherwise automatically.

Taking the simplest case with two inertia members freely mounted and normally located by springs in their neutral positions at right angles to each other, an acceleration at right angles to the axis of one member will produce a movement of that member from its neutral position which will only be resumed on the vehicle assuming a uniform speed or coming to rest, but in the latter event the inertia member will have moved to the other side of the neutral position during deceleration. Consequently, if the movements are measured and the indicated accelerations are plotted against time, a curve will be obtained which for a double, i. e., return journey along a straight line will enclose an equal area above and below the datum or zero line joining the positions graphically representing the start and finish of the journey.

Similar conditions will apply to the other inertia member and by correlating or co-ordinating the accelerations as measured by the movements of both members, a resultant is obtained giving the extent and direction of the movement of the craft.

The present invention has for its object to provide improved apparatus facilitating navigation of aircraft and like vehicles by furnishing the operator or navigator thereof with an accurate visual indication of the position of the craft at any stage of the outward or return journey and irrespective of weather conditions.

Broadly stated, apparatus according to the invention for furnishing a speed and/or positional indication in a moving vehicle, say an aircraft, comprises two inertia members or spring actuators mounted in a stabilised frame on the vehicle and free to move in directions at right angles to each other in consonance with accelerations of the vehicle, and hydraulic means for integrating such movements to furnsh an indication of the speed and direction of travel of the vehicle.

The term "hydraulic means" as used in this specification is intended to comprehend any apparatus wherein the controlled flow of hydraulic medium is adapted to effect displacement of an indicator or member associated therewith in such manner that the displacement is proportional to the rate and duration of flow.

Preferably, each inertia member actuates a multiple-way fluid valve, in an hydraulic system having a cylinder and double-acting piston so as to pass medium to one or other end of the cylinder to move the piston in one or other sense according to the sense or direction in which acceleration of the vehicle takes place and the valve has ports or metering orifices passing the hydraulic medium to the respective end of the cylinder in quantities regulated by the varying positions of the actuating member in turn governed by the momentary kinematic condition of the vehicle, and preferably also each inertia member actuates an independent two-stage hydraulic system, pistons of the secondary hydraulic systems being adapted to furnish an indication of the distance and direction of the movement of the vehicle and thus to show its position at any time.

The invention will be further described with reference to the accompanying explanatory drawings which illustrate diagrammatically and by way of example, and in which drawings—

Fig. 2 represents diagrammatically a system for remotely controlling the integrating and indicating mechanism which may be found desirable so as to avoid the necessity of carrying the indicating mechanism or instrument on the gyroscopically stabilised framework of the inertia members.

Figure 1:
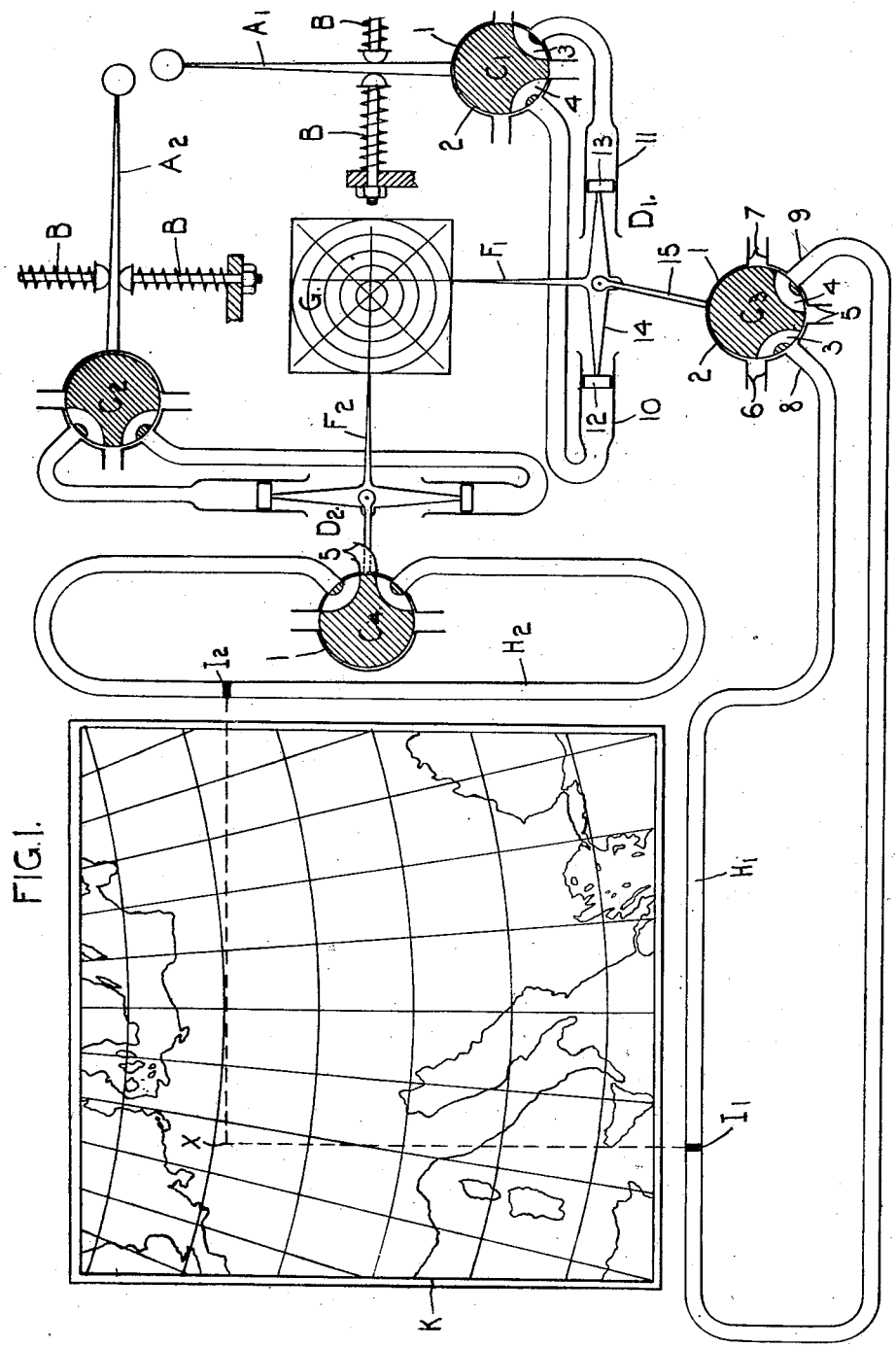
Fig. 1 is a diagrammatic representation showing the two inertia members operating through an hydraulic system to furnish an indication firstly of the speed and direction of the craft and secondly of its position at any instant during its travel.

As will be understood, any type of horizontal N—S stabilisation may be employed for the mounting of the actuators. In the following description reference will be made to the commonest type, i. e., a normal gyrocompass consisting of one gyroscope with horizontal axis suspended from a freely pivoting attachment; as is known, a gyroscope so mounted will precess until its axis lies N—S. A smaller gyroscope with vertical axis might be added to reduce E—W oscillations—another method would be an "artificial horizon" coupled with a magnetic compass, such known methods of stabilisation forming no part of the present invention, and not therefore being illustrated.

Referring now to the drawings, where like characters indicate like or equivalent parts, but first more particularly to Fig. 1, $A_1$ and $A_2$ represent the inertia elements or actuators which are preferably located in the horizontal plane in which the movement of each takes place when measuring an acceleration, and preferably each comprises a lever with vertical pivot loaded at one end and having spring or equivalent means B. urging its return to neutral or mid-position when it is deflected by an acceleration in either sense. Conveniently the lever actuators $A_1$ and $A_2$ will normally be positioned to lie N—S and E—W respectively, the lever $A_1$ serving to indicate longitude and the lever $A_2$ latitude in the manner now to be explained.

The actuators are shown in their neutral or mid-position where they would remain with the craft at rest or undergoing uniform motion. They are interconnected to two multiple way rotary valves $C_1$, $C_2$ respectively (hereafter termed primary valves), so that the valves are partially rotated when the actuators are deflected by an acceleration.

The primary valves $C_1$, $C_2$ are facsimiles one of the other and each comprises a cylindrical barrel 1 with five ports and a rotary or oscillatory plug or cock 2 arranged with two ducts 3 and 4, the position of which in relation to the ports is determined by the actuating member $A_1$ or $A_2$ as the case may be.

The central port 5 is supplied with hydraulic medium by a constant pressure reservoir or pump or similar device (not shown) and symmetrically of the barrel 1 on each side of the central feed port 5 are two pairs of ports, diametrically opposite ports 6 and 7 returning the hydraulic medium to the pump or storage reservoir having a constant back pressure. Intermediate ports 8 and 9 communicate with respective ends of an indicator $D_1$ or $D_2$ each of which comprises a cylinder or pair of cylinders 10 and 11 housing pistons 12 and 13 which are bridged by a member 14 carrying a speed indicating needle or cursor, $F_1$ for the actuator $A_1$ and $F_2$ for the actuator $A_2$.

G represents a calibrated gauge or dial over which the needles or cursors $F_1$, $F_2$ move, both intersecting at the centre of the dial when the craft is at rest, and moving more or less to one or other side of the centre of the dial according to the speed and direction of the craft. In the position shown in Fig. 1 the cursor $F_2$ responsive to the N—S actuator $A_2$ is central showing the craft to be on an E—W course, and the cursor $F_1$ responsive to the E—W actuator $A_1$ lies on the right of the dial centre showing that the course is due east, the dial calibrations giving the ground speed in miles or kilometres per hour. It will be noted that the actuator $A_1$ is in its neutral mid-position signifying that the craft after an acceleration (or accelerations) integrated by the primary valve $C_1$ to the speed shown by the cursor $E_1$, has attained and is momentarily holding such speed uniform.

Also it will be appreciated that the radial distance from the origin or centre of the dial G of the point of intersection of the cursors $F_1$, $F_2$ indicates the actual ground speed, the compass position of the particular radius showing the direction. Advantageously therefore, the dial G bears concentric circular speed calibrations, and also radial lines or compass points instantly showing the direction of travel as indicated by the instrument which latter indication can be readily verified or corroborated by the reading of the normal compass of the craft.

In addition to the speed and direction indication furnished by the instrument G the actuators $A_1$ and $A_2$ also serve to furnish a continuous indication of the position of the craft. To this end secondary integrating valves $C_3$ and $C_4$ are provided which are similar to the primary valves $C_1$, $C_2$ excepting that instead of being oscillated directly by the actuators $A_1$, $A_2$, they are mechanically coupled by lever arms 15 to the piston bridges 14 of the primary indicators $D_1$ and $D_2$ respectively.

The secondary valves may also control needles or cursors similar to $F_1$ and $F_2$ although more conveniently as shown their cylinders $H_1$ and $H_2$ are of translucent or transparent material and the indicating pistons $I_1$ and $I_2$ therein are contrived in co-operation with a source or sources of light to cast a shadow or beam across an indicating panel K, preferably a graticule showing a map or portion of the earth's surface appropriate to the zone in which the craft is operating. The larger the scale of the map and the greater the movement of the indicating pistons $I_1$ and $I_2$ for a given distance the greater will be the accuracy of the positional indication furnished by the intersection of the shadows or beams cast by the pistons on the graticule, but as will be appreciated, considerations of the size of the area to be covered which will vary with circumstances, will regulate the scale to be employed.

Referring again to Fig. 1, assuming the intended direction of travel generally is south and/or east from the starting point, the pistons would have been initially adjusted so that their co-ordinate or intersection coincided with such starting point where represented on the graticule panel K, preferably adjacent the top left hand i. e., northwest corner thereof. As shown, with the craft temporarily on a true W—E course, the N—S piston $I_2$ is held stationary in its cylinder $H_2$ the ports of both its primary and secondary valves $C_2$, $C_4$ being closed. Although the primary valve $C_1$ of the E—W piston $I_1$ is closed by its actuator $A_1$, the craft is moving east at the speed indicated on the dial G by the needle $F_1$ carried on the bridge 14 of the indicator $D_1$ and as this bridge is also mechanically coupled to the secondary valve $C_3$, the plug 2 of the latter is rocked so that its duct 4 passes the hydraulic medium under pressure from the feed port 5 through the intermediate port 9 to the left hand end of the distance indicating cylinder $H_1$, while simultaneously its duct 3 opens communication between the other end of the cylinder $H_1$, through the intermediate and return ports 8 and 6 so that the piston $I_1$ moves progressively towards the right, that is to say its beam or shadow travels eastwards across the panel K at a rate corresponding to the speed of the craft as regulated by the metering orifice or open area of the ports 5—9, and 8—6 in turn controlled from the primary indicator $D_1$ set by the actuator $A_1$ to a position corresponding to the W—E speed of the craft.

Thus the point X which is the co-ordinate of the two pistons $I_1$ and $I_2$ positively indicates on the map the actual position both as regards latitude and longitude.

As will be understood, in place of the translucent cylinders $H_1$—$H_2$ and slugs $I_1$—$I_2$ needle or cursor indicators similar to those represented at $F_1$, $F_2$ for the dial G could be employed for the panel K or vice versa. As a further alternative, the secondary indicators $I_1$ and $I_2$ may be arranged to furnish a reading in degrees, minutes and seconds of longitude and latitude instead of a direct indication on a map panel K, and if desired the speed indicator dial G and primary cursors $F_1$, $F_2$ can be omitted although for aircraft—in conjunction with the conventional air speed indicator—it may be useful in assessing wind speed and direction, and probable drift.

Referring now to the radio-electric coupling illustrated in Fig. 2 for remotely actuating the hydraulic integrating system already described, the primary valve $C_1$ has fixed for oscillation with its plug or cock 2 a curved soft iron bar 20 which embraces (with small clearance) a straight bar 21 mounted on the shaft 22 of a motor 23. 21 is the iron core of a winding 24 the two ends of which go to two slip-rings 25—the other end of the shaft 22 carries the movable plates 26 of a variable condenser 27 which is part of a radio oscillator indicated in dotted lines at RO.

The gyrocompass frame 30 is freely mounted on gimbals 31 and carries the actuators $A_1$ and $A_2$ pivoted at 32 and 33 respectively. $A_1$ carries one plate of the condenser 34 of a small oscillating circuit OS.

As the motor 23 revolves, it makes the frequency of the radio oscillator RO change to and fro between two set values. At one point in its revolution the circuit OS will resonate, and the current induced will momentarily light a bulb 35 inserted in the circuit OS; the light from bulb 35 produces a current in a photo cell 36 which is amplified at 37 and carried by brushes 38 to the solenoid winding 24. The solenoid magnetically pulls the cock $C_1$ slightly backwards or forwards if it does not find it exactly aligned at that moment—the condenser 27 must be calibrated so that each degree of acceleration on $A_1$ will cause the right setting of cock $C_1$—$C_1$ will thus be adjusted to every new position by a rapid succession (1 per rev. of motor 23) of sharp magnetic pulls.

The actuator $A_2$ operates its cock $C_2$ in a similar manner through a separate mechanism not shown. Interference between the two bulbs 35 and the two cells 36 can be avoided by staggered timing, different colours, or other means. Alternatively, induction could be substituted by optical means and photo cells or other remote coupling, which would enable only the actuators to be gyroscopically stabilised, thus avoiding the unwanted precession of the gyro unit which would otherwise be caused by the drag and torque of the associated integrating mechanism.

Other hydraulic means may be utilised for integrating the acceleration as measured by the actuators, e. g., hydraulic pumps with controllable delivery.

The gyroscopic stabilised frame may also mount a third actuator disposed to measure and register vertical displacement thus to indicate the altitude of the craft.

With a suitable projection for the map K it appears that great circle navigation could be obtained by steering to a constant setting of the ground velocity indicator G.

By the present invention there is obtained an improved method and apparatus furnishing a true speed and true positional indication on a moving vehicle, say an aircraft, irrespective of wind velocity, drift or other weather conditions prevailing.

What I claim is:

1. Apparatus furnishing a speed and/or positional indication in a moving vehicle, say an aircraft, comprising a stabilised frame carried by the vehicle, two inertia members mounted in said frame and free to move in directions at right angles to each other in consonance with accelerations of the vehicle, and hydraulic means for integrating such movements to furnish an indication of the speed and direction of travel of the vehicle, wherein the hydraulic means includes for each inertia member an hydraulic system having a cylinder with a double-acting piston in the cylinder and a multiple-way valve feeding the cylinder and actuated by the member to pass medium to one or other end of the cylinder to move the piston in one or other direction according to the sense or direction in which the acceleration of the vehicle takes place.

2. Apparatus according to the preceding claim 1 wherein the hydraulic means includes for each inertia member an hydraulic system having a cylinder with a double-acting piston in the cylinder and a multiple-way valve feeding the cylinder and actuated by the member to pass medium to one or other end of the cylinder to move the piston in one or other direction according to the sense or direction in which the acceleration of the vehicle takes place, and wherein the valve has ports or metering orifices passing hydraulic medium to the respective ends of the cylinder in quantities regulated by the varying positions of the actuating member in turn governed by the momentary kinematic condition of the vehicle.

3. Apparatus according to the preceding claim 1 wherein the hydraulic means includes for each inertia member an hydraulic system having a cylinder with a double-acting piston in the cylinder and a multiple-way valve feeding the cylinder and actuated by the member to pass medium to one or other end of the cylinder to move the piston in one or other direction according to the sense or direction in which the acceleration of the vehicle takes place, and wherein the cylinders are arranged at right-angles to each other and their pistons co-operate with a common dial or gauge to correlate the movements and to furnish an indication of the ground speed and direction of movement of the vehicle.

4. Apparatus according to the preceding claim 1 wherein the hydraulic means includes for each inertia member an independent two-stage hydraulic system, each stage having a cylinder with a double-acting piston in the cylinder and a multiple-way valve feeding the cylinder, the valve of the first stage being actuated by its inertia member to pass medium to one or other end of its cylinder to move the piston therein in one or other direction according to the sense or direction in which the acceleration of the vehicle takes place, and the valve of the second stage being actuated by the piston of the first stage.

5. Apparatus according to claim 1 wherein the inertia members are mounted in a gyroscopically stabilised frame and the hydraulic integrating means is separately carried by the vehicle including a radio-electric coupling between the members and the hydraulic integrating means.

GEORGE VINCENT PLAUT-CARCA‗‗‗‗.